Figure 1:
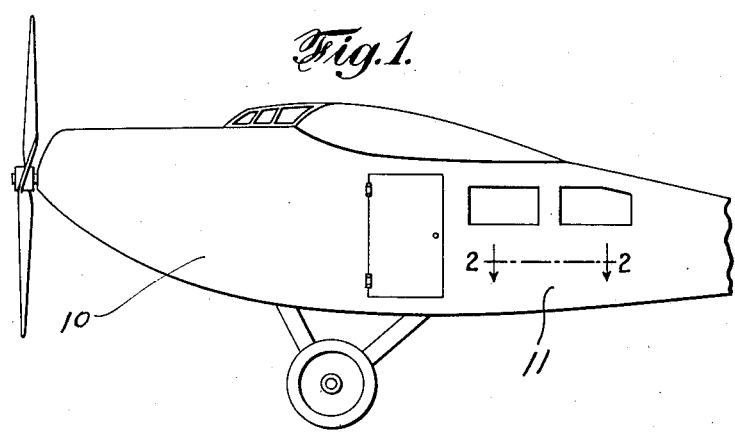

Sept. 11, 1934.   H. SWAN ET AL   1,973,124
AIRPLANE STRUCTURE
Filed Nov. 14, 1931

INVENTOR
H. Swan & S. Higgins
BY
Jos. H. Nielsen
ATTORNEY

Patented Sept. 11, 1934

1,973,124

UNITED STATES PATENT OFFICE 1,973,124

AIRPLANE STRUCTURE

Hylton Swan, Upper Montclair, and Sigfried Higgins, Verona, N. J., assignors to Bakelite Corporation, New York, N. Y., a corporation of Delaware Application November 14, 1931, Serial No. 575,154

4 Claims. (Cl. 154—44)

This invention relates to airplane cabin and equivalent structures built with the end in view of lessening the transmission of sound.

A serious problem of the present day is the reduction of sound transmission through the walls of an airplane cabin, and various materials and combinations of them have been proposed. The further requirements of minimum weight, thinness, sufficient strength, etc. however, interpose other limitations.

It has heretofore been proposed to utilize compositions obtained from fibrous materials bonded with synthetic resins in airplane construction. Such compositions have much to recommend them as they can be made light in weight and with sufficient strength in thin slabs or plates. Preferably the bonding medium is of a resinoid nature, that is, it can be heat-hardened to a final infusible and insoluble state characterized by inertness to atmospheric conditions, acids, weak alkalies and similar solvents, as well as by a pleasing permanent finish requiring no additional treatment; it is, however, seriously deficient in the property of sound proofness since resonance is a characteristic and upon impact it gives a sharp reverberating sound. Furthermore it is characteristic of compositions of fibrous materials and resinoids to be hard and inflexible so that in the finished form they are apt to crack or split when cut, nailed or otherwise operated upon.

We have now discovered that a remarkable deadening of sound can be obtained and other objections arising in manufacture and use can be largely overcome while retaining the desirable properties of resinoid bonded compositions. In addition compositions prepared as hereinafter described exhibit resilience and flexibility to a surprising degree which further enhance their usefulness for the purposes here indicated.

In the manufacture of laminated material in accordance with this invention these improved technical effects follow from the interposition of sheets of rubber between sheets of paper or other fibrous or fabric material that have been incorporated with a phenolic resinoid in its initial fusible or potentially reactive condition. As a specific illustration, three sheets of paper about .006" to .010" thick and impregnated with a potentially reactive phenol resinoid, have superposed upon them a sheet of incompletely cured rubber about .0075" thick. Further layers of paper and rubber in about the same proportions are superimposed to give a stack of the desired thickness. The relative proportion of impregnated sheets to rubber sheets can of course be changed as desired; for the purposes of this invention, however, it is desirable that the resinoid-impregnated material form the major portion of the composite product. The stack so formed is then submitted to the usual pressures followed in laminated practice, namely, about 1000 to 2000 pounds to the square inch, and it is simultaneously submitted to heat at about 300° F. Heat and pressure are applied for a period depending upon the thickness of the stack and the type of phenol resinoid used; for instance, a stack comprising five layers comprised of a multiplicity of sheets of paper and four intermediate layers of rubber, the paper having been previously impregnated with a cresol-formaldehyde resinoid containing hexamethylene-tetramine as a hardening agent, requires a molding period of about 15 minutes. The treatment in the press converts the phenolic resinoid to its final infusible condition and at the same time vulcanizes the rubber sheets.

For most uses it will be found desirable to have one or more resin-impregnated sheets as the surface sheets of the stack, thereby yielding a product whose surface exhibits the properties of a resinoid composition. A rubber sheet or an unimpregnated fibrous sheet, however, can be used as a surface sheet and the usual molding operation followed, particularly where it is intended to cement the finished laminated product to a dissimilar material such as cork, wood, metal, etc. to obtain sound absorption or other desired technical effects.

The rubber sheets may be of any desired thickness, for example up to $\frac{1}{32}$" or $\frac{1}{16}$", and can be provided with a fabric or metal reinforcement such as canvas, duck, wire screen, etc. The rubber, however, need not be supplied in sheet form; paper which has been impregnated or coated with a phenol resinoid can be sprayed or dipped with rubber having the proper composition and consistency, so that it will vulcanize when heat and pressure are applied. Rubber can also be applied prior to molding by passing treated paper and rubber sheets through warm calender rolls effecting a joining of the two materials; this simplifies the assembly of a stack. The resinoid impregnation of interior sheets of paper may be omitted and the rubber alone relied upon as a bonding agent. There are no restrictions placed by this invention on the composition of the rubber component or its sulfur content except that it is desirable that for most uses for which this invention is intended that the rubber component of the finished laminated material be in a soft or semi-soft condition after the heating or curing operation. In place of paper as the fibrous ingredient or filler, other materials can be employed such as woven fabric, felt, asbestos in loose condition or woven, etc.

Laminated material made in accordance with this invention having resinoid surfaces and having semi-soft rubber layers intermediate resinoid impregnated layers has a characteristic yield or resilience that is not present in laminated material prepared without the inclusion of rubber, while at the same time it is not distinguishable from resinoid laminated material in finish, freedom from absorption, chemical inertness, permanency, etc. This property of resilience of the composite laminated material is strikingly evident in comparison with straight resinoid laminated material; and while an impact upon the resinoid material gives a sound that is noisy to an obnoxious degree, an impact upon the composite material gives a muffled subdued sound showing a practically complete lack of resonance.

Though composite laminated material as herein described comprises continuous layers of resinoid impregnated sheets separated by continuous layers of rubber, the composite product has a surprising flexibility out of proportion to the percentage of rubber included. For instance a straight resinoid laminated material has an average modulus of elasticity of 1,200,000 pounds per square inch. The modulus of elasticity of a composite laminated material of about the same thickness and made in accordance with the specific example above is only about 22,000 to 29,000 pounds per square inch.

The composite material is furthermore characterized by a relative freedom from warping that in practice operates as a limitation upon the size of laminated sheets that can be produced. Accordingly the invention lends itself to the production of sheets of larger size than heretofore practicable.

The improved shock resistance of the composite material as compared with resinoid bonded material is evidenced by its cold punching property and the fact that it can be nailed or otherwise worked. This permits uses of increased thicknesses of laminated material and furthermore enlarges the uses for which the invention is adapted.

Instead of securing the composite material described by cementing to cork, it is found that a satisfactory bond can be obtained by including cork in the form of a sheet or granules as one or more layers of the composite material either exteriorly or interiorly. The cork layers can be of any desired thickness, and if made from cork particles the particles can be bonded into sheet form with any suitable medium such as pitch, glycerine-gelatin, rosin mixtures, etc., previous to their incorporation into the composite structure. The cork layers are preferably surfaced with a resinoid varnish and the solvent removed before being placed in a stack with the rubber and fibrous layers. Preferably also resinoid-impregnated fibrous sheets are interposed between rubber and cork layers to impart their strengthening effect, but a resinoid coating in itself is found sufficient to make a bond.

Figure 2:
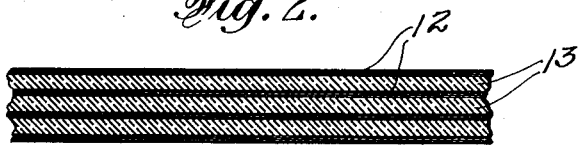

In order to illustrate the invention an embodiment thereof is disclosed in the accompanying drawing in which Fig. 1 is an elevation of an airplane cabin; Fig. 2 is an enlarged cross-section of line 2—2 of Fig. 1 showing a fragmentary portion of the wall construction; and Fig. 3 is a similar cross-section of the modified wall construction.

The airplane cabin 10 may take any desired shape, for example, as shown in Fig. 1. In accordance with this invention the wall 11 is made up of laminations. This wall construction is shown in further detail in Fig. 2 and as there illustrated is composed of alternating layers of impregnated sheets of paper 12 and layers of rubber 13. The assembly is subjected to the action of heat and pressure as previously described.

Figure 3:

In the modification shown in Fig. 3 the laminations show alternating layers of impregnated sheets of paper 12 and layers of rubber 13 and layers of cork 14. The laminated structure is made up as heretofore described.

Ordinarily the laminated wall structure is supplied in the form of plates and these plates are secured to ribs or other supporting members forming the airplane cabin. Other known modes of constructing the airplane cabin can be substituted.

We claim:

1. Airplane cabin or equivalent structure having as an enclosing wall a laminated material including a layer of fibrous sheet material having incorporated therewith a heat-hardened phenolic condensation product and a layer of vulcanized rubber bonded thereto for minimizing the transmission of sound through the wall whereby a pronounced degree of flexibility is imparted to the material.

2. Structure according to claim 1 including a layer of cork as part of the laminated material.

3. Laminated article for minimizing the transmission of sound and adaptable for airplane cabins and equivalent structures comprising in combination a layer of fibrous sheet material having incorporated therewith a synthetic phenolic resin and a layer of rubber bonded to said first named layer whereby a pronounced degree of flexibility is imparted to the article.

4. Laminated article for minimizing the transmission of sound and adaptable for airplane cabins and equivalent structures comprising in combination a layer of fibrous sheet material having incorporated therewith a synthetic phenolic resin and a layer of rubber and a layer of cork bonded to said first named layer whereby a pronounced degree of flexibility is imparted to the article.

HYLTON SWAN.
SIGFRIED HIGGINS.